US007131322B2

(12) United States Patent
Booms et al.

(10) Patent No.: US 7,131,322 B2
(45) Date of Patent: Nov. 7, 2006

(54) VEHICLE EVAPORATIVE SYSTEM DIAGNOSTIC

(75) Inventors: Chris J Booms, Milford, MI (US); Roger C Sager, Munith, MI (US); William B Blomquist, Lake Orion, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 8 days.

(21) Appl. No.: 11/101,119

(22) Filed: Apr. 7, 2005

(65) Prior Publication Data

US 2006/0225491 A1 Oct. 12, 2006

(51) Int. Cl.
*G01M 15/00* (2006.01)

(52) U.S. Cl. .................................................... 73/118.1

(58) Field of Classification Search .................... 73/40, 73/46, 47, 49.7, 116, 117.2, 117.3, 118.1

See application file for complete search history.

(56) References Cited

U.S. PATENT DOCUMENTS 5,685,279 A * 11/1997 Blomquist et al. .......... 123/520
6,202,478 B1 3/2001 Blomquist et al.
6,722,189 B1 * 4/2004 Fabre .......................... 73/116
6,823,850 B1 11/2004 Hurley
6,928,991 B1 * 8/2005 Hurley ....................... 123/519
7,047,950 B1 * 5/2006 Hurley ....................... 123/516
2001/0042399 A1 * 11/2001 Dawson et al. .............. 73/49.7
2005/0056088 A1 * 3/2005 Hurley ...................... 73/118.1
2005/0183701 A1 * 8/2005 Hurley ....................... 123/519

* cited by examiner

*Primary Examiner*—Eric S. McCall
(74) *Attorney, Agent, or Firm*—Ralph E. Smith

(57) ABSTRACT

A diagnostic method for an evaporative emission control system of an automotive vehicle determines functionality of one of a purge valve and/or a vacuum switch and valve assembly. The vacuum switch and valve assembly is located between a carbon canister and atmosphere and is either open or closed according to whether the system is in a high or low negative pressure condition. A controller determines if the vacuum switch and valve assembly is functioning properly according to the high or low negative pressure condition. The controller determines if the purge valve is functioning properly based on engine performance characteristics.

9 Claims, 3 Drawing Sheets

VEHICLE EVAPORATIVE SYSTEM DIAGNOSTIC

FIELD OF THE INVENTION

The present invention relates to evaporative systems for automotive vehicles, and more particularly to performing diagnostic procedures on an evaporative system.

BACKGROUND OF THE INVENTION

Modern automotive vehicles include a fuel tank and an evaporative emission control system that collects fuel vapors generated in the fuel tank. The evaporative emission control system includes a vapor collection canister that collects and stores fuel vapors. The canister, which is typically a carbon canister that contains an activated charcoal mixture, collects fuel vapors which accumulate during refueling of the vehicle or from increases in fuel temperature. The evaporative emission control system also includes a purge valve placed between an intake manifold of an engine of the vehicle and the canister. The purge valve is opened by an engine control unit in order to purge the canister. The collected fuel vapors are drawn into the intake manifold from the canister for combustion within a combustion chamber of the engine.

Vehicle diagnostic systems monitor certain performance and functionality characteristics of the evaporative emission control system. For example, the vehicle diagnostic system may determine if a leak exists in the system. In one such system, a vacuum regulator sensor unit draws a vacuum on the evaporative emission control system and senses whether a loss of vacuum occurs within a specified period of time. In systems that utilize positive pressurization, the evaporative emission control system is pressurized to a set pressure. A sensor determines whether the pressure remains constant over a certain period of time.

SUMMARY OF THE INVENTION

A diagnostic method for an evaporative emission control system for an automotive vehicle, the system in fluid communication with emissions from a fuel tank, an engine, a carbon canister, and atmosphere, comprises generating a signal that is indicative of a position of a switch located between the carbon canister and the atmosphere. The position is one of open and/or closed when the evaporative emission control system is in one of a high and/or low negative pressure condition. The signal is monitored to determine whether the evaporative emission control system is in the high or low negative pressure condition. The evaporative emission control system is purged for a first period in order to dissipate negative pressure if the signal indicates that the emission control system is in the high negative pressure condition. The signal is monitored to determine if the evaporative control system changes from the high negative pressure condition to the low negative pressure condition during the first period.

In another aspect of the invention, flow of emissions through a purge valve that is located between the engine and the canister is monitored. The purge valve is operable to modulate between a fully open and a fully closed position. A first ratio of burnable impurities in the emissions is determined. If the first ratio is above a first threshold, the purge valve is indicated to be functioning properly. If the first ratio is not above the first threshold, it is determined if flow of emissions through the purge valve is above a second threshold. A signal that is indicative of a position of a switch located between the carbon canister and the atmosphere is generated. The position is one of open and/or closed when the evaporative emission control system is in one of a high and/or low negative pressure condition. The signal is monitored to determine whether the evaporative emission control system is in the high or low negative pressure condition. A ratio of time that the evaporative emission control system is in the high negative pressure condition during the first period is calculated. It is determined if the ratio of time is above a second threshold. If the ratio of time is above the second threshold, the purge valve is indicated to be functioning properly. If the ratio of time is not above the second threshold, the purge valve is indicated to be not functioning properly.

In another aspect of the invention, a first ratio of burnable impurities in the emissions is calculated. The purge valve is indicated to be functioning properly if the first ratio is above a first threshold. The purge valve is opened to the fully open position if the first ratio is not above the first threshold. Fuel and air flow into the engine is adjusted according to an expected ratio of burnable emissions flowing through the purge valve, wherein the expected ratio is calculated according to the position of the purge valve. One or more engine performance characteristics that are indicative of whether the expected ratio of burnable emissions is flowing through the purge valve are monitored. The purge valve is indicated to be functioning properly if the one or more engine characteristics indicate that the expected ratio of burnable emissions is flowing through the purge valve. The purge valve is indicated to be not functioning properly if the one or more engine characteristics indicate that the expected ratio of burnable emissions is not flowing through the purge valve.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
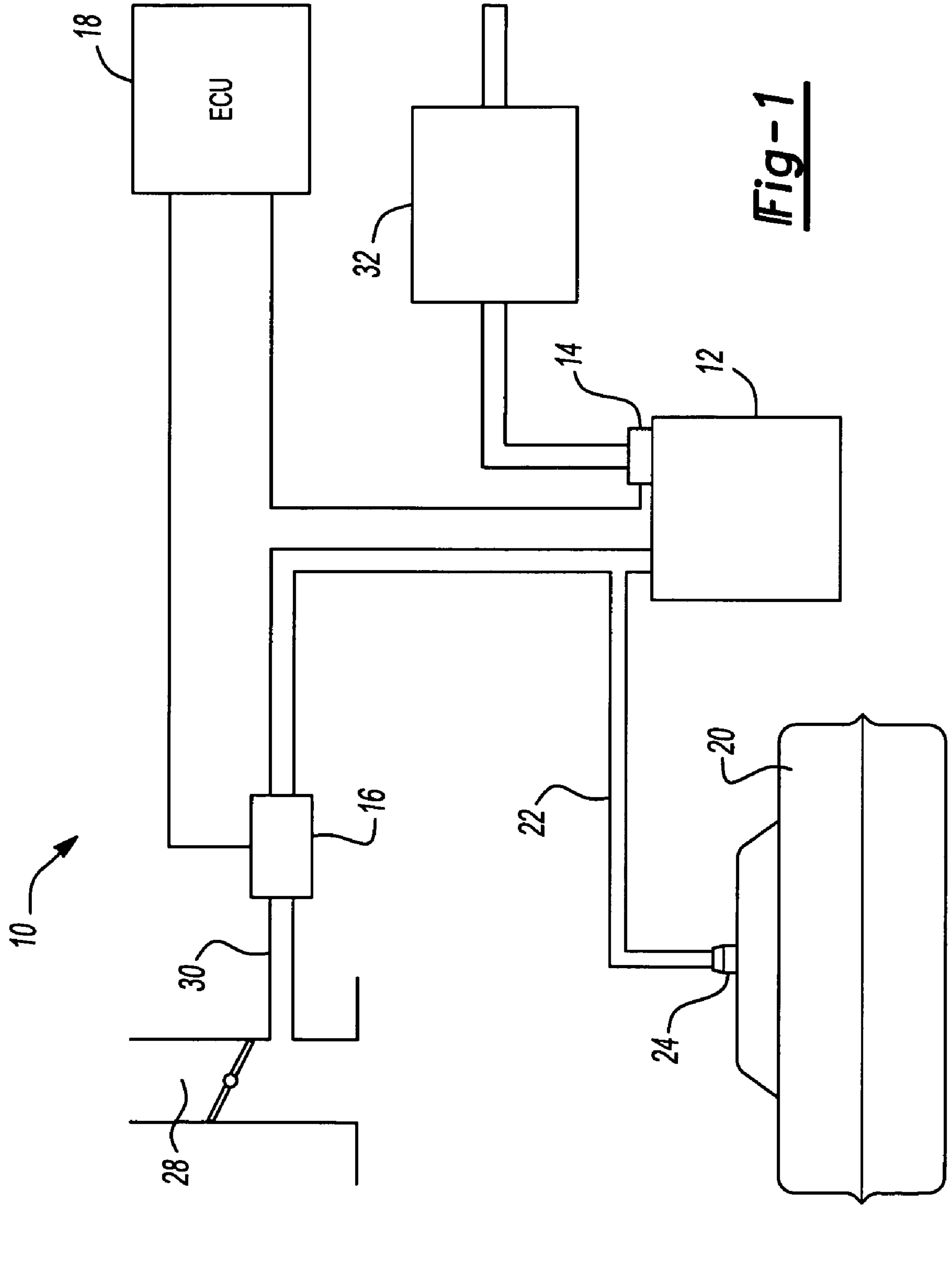
FIG. 1 is a functional block diagram of an evaporative emission control system according to the present invention.

Referring to FIG. 1, an evaporative emission control system 10 for an automotive vehicle is shown. The evaporative emission control system 10 includes a canister 12, a vacuum switch and valve assembly 14, a purge valve 16, and a controller 18. The controller 18, such as a vehicle engine control unit (ECU), communicates with the vacuum switch and valve assembly 14 and the purge valve 16. The controller 18 controls the vacuum switch and valve assembly 14 and the purge valve 16 and performs diagnostic procedures on the control system 10 according to the method of the present invention to be described herein. It is to be understood that other suitable components that include valves and/or switches, such as a leak detection pump and valve assembly, may be used in place of the vacuum switch and valve assembly 14. An exemplary leak detection pump and valve assembly is described in more detail in commonly owned U.S. Pat. No. 6,202,478, entitled "Evaporative System Leak Detection Feature After A Refueling Event," which is hereby incorporated by reference in its entirety.

A fuel tank 20 is connected to the canister 12 by a conduit 22 and a vapor flow control valve 24. The canister 12 is connected to an intake manifold 28 by a conduit 30. The purge valve 16 is mounted on the conduit 30. A remote filter 32 is connected to the vacuum switch and valve assembly 14 and the atmosphere.

A supply of liquid fuel for powering an engine of the automotive vehicle is placed in the fuel tank 20. As fuel is pumped into the fuel tank 20 or as the temperature of the fuel increases, vapors from the fuel pass through the conduit 22 to the canister 12. The purge valve 16 is normally closed. Under certain operating conditions conducive to purging, the controller 18 operates the purge valve 16 such that a certain amount of engine intake vacuum is delivered to the canister 12, causing the collected vapors to flow from the canister 12 through the conduit 30 and the purge valve 16 to the intake manifold 28. The vapor then flows into the combustion chambers for combustion. In the present invention, the controller 18 operates the purge valve 16 to purge the vapors from the canister 12 after the engine has been shut off in order to dissipate any residual vacuum in the control system 10. The controller 18 then performs diagnostic procedures on the control system 10.

In the present invention, the controller 18 determines if the vacuum switch and valve assembly 14 is functioning properly. An exemplary vacuum switch and valve assembly 14 is described in commonly owned U.S. Pat. No. 6,823,850, entitled, "Evaporative Emission System Integrity Module," which is hereby incorporated by reference in its entirety. The vacuum switch and valve assembly 14 includes a valve that is biased open or closed according to vacuum or pressure in the system 10. The controller 18 communicates with the vacuum switch and valve assembly 14 to determine whether the valve is open or closed. For example, the vacuum switch and valve assembly 14 includes a switch that sends a signal to the controller 18 that is indicative of the position of the valve.

Figure 2:
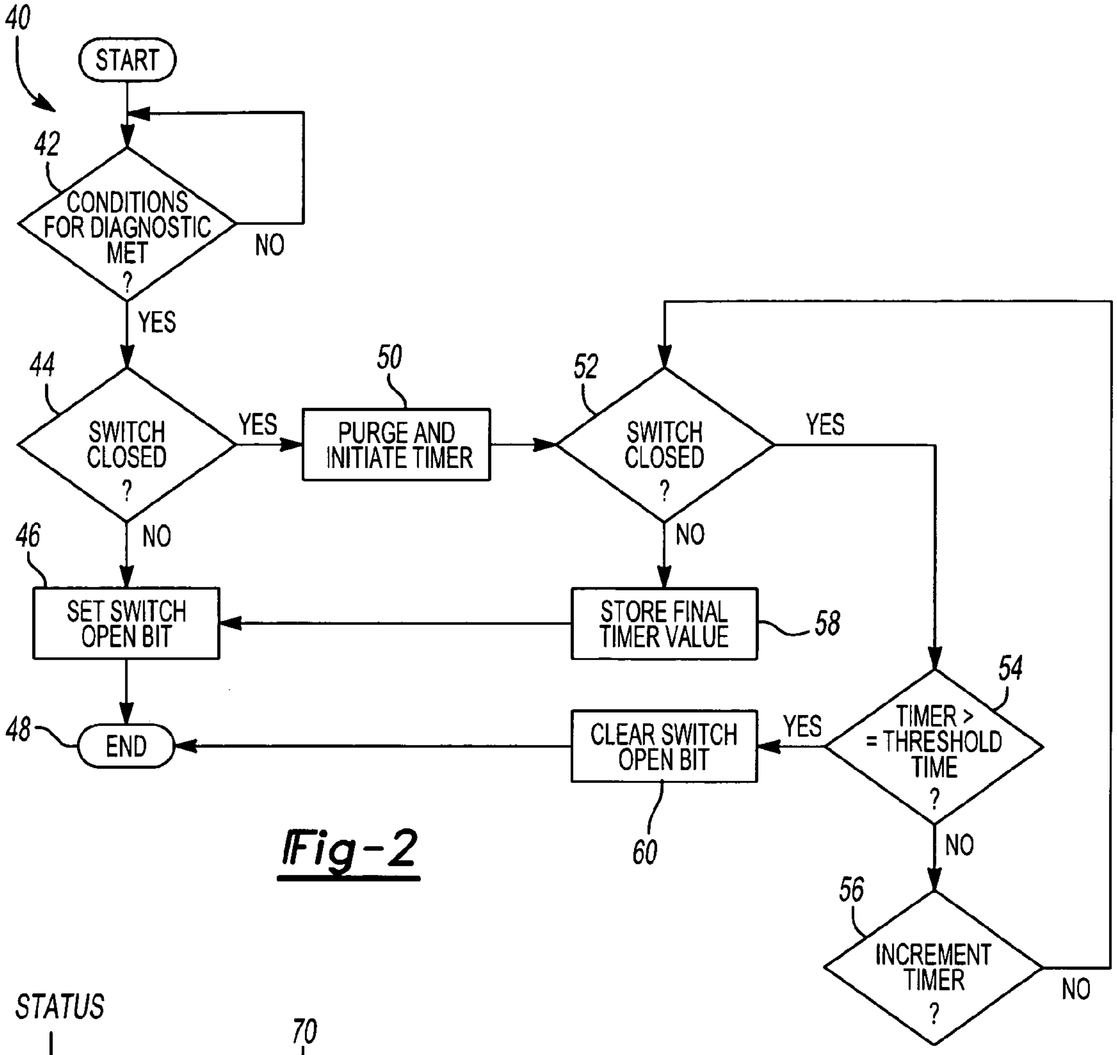
FIG. 2 is a flow diagram of a vacuum switch and valve assembly integrity diagnostic method according to the present invention.

Referring now to FIG. 2, a vacuum switch and valve assembly integrity diagnostic method 40 is shown. At step 42, the controller determines if one or more vehicle conditions are met. For example, step 42 determines if the engine is powered down, engine speed is zero, and that a sufficient delay has passed to ensure that residual engine activity is not causing vacuum in the system. If the conditions are not met, step 42 is repeated. If the conditions are met, the method 40 continues to step 44. At step 44, the controller communicates with the vacuum switch and valve assembly 14 to determine if the switch is closed. In the preferred embodiment, the switch is closed in the presence of vacuum in the system. Conversely, the switch is open if there is very low or no vacuum, or high positive pressure. If the switch is open, the method 40 determines that the switch was open at engine shutoff and continues to step 46. In other words, at engine shutoff, either system vacuum was sufficiently low, or system pressure sufficiently high, to open the switch, indicating that the vacuum switch and valve assembly is functional. At step 46, the controller 18 stores data that indicates that the switch of the vacuum switch and valve assembly 14 is open. For example, the controller 18 toggles a two-state bit to indicate the open or closed status of the switch. The method 40 then terminates at step 48.

If the controller determines that the switch is closed at step 44, this indicates that either there is sufficient vacuum in the system to keep the switch closed, or that the vacuum switch and valve assembly 14 is not functioning properly. The method 40 continues to step 50. At step 50, the controller operates the purge valve 16 in order to purge the system of vacuum and initiates a timer, then continues to step 52. For example, the controller may activate a purge solenoid in order to open the purge valve 16. At step 52, the controller again communicates with the vacuum switch and valve assembly 14 to determine if the switch is closed. If the switch is still closed, the method continues to step 54. At step 54, the controller determines if the timer is equal to or exceeds a threshold time. If the timer is not greater than or equal to the threshold time, the controller increments the timer at step 56 and returns to step 52 to determine if the switch is closed or open. If the controller determines that the switch is open before the timer equals or exceeds the threshold time, the method 40 continues to step 58. At step 58, the controller stores the final value of the timer and continues to 46.

If the controller determines that the switch is open at 44, or that the switch opens before the timer exceeds a particular time threshold at step 52, the vacuum switch and control valve assembly 14 is determined to be functional. Conversely, if the timer exceeds the time threshold at step 54, the method 40 continues to step 60. At step 60, the controller stores data that indicates that the switch is closed, and terminates at step 48. In other words, after purging any remaining vacuum in the system for a threshold time, the switch remains closed, indicating that the vacuum switch and valve assembly is not functioning properly. For example, this may indicate that either the valve or the switch is malfunctioning.

Figure 3:
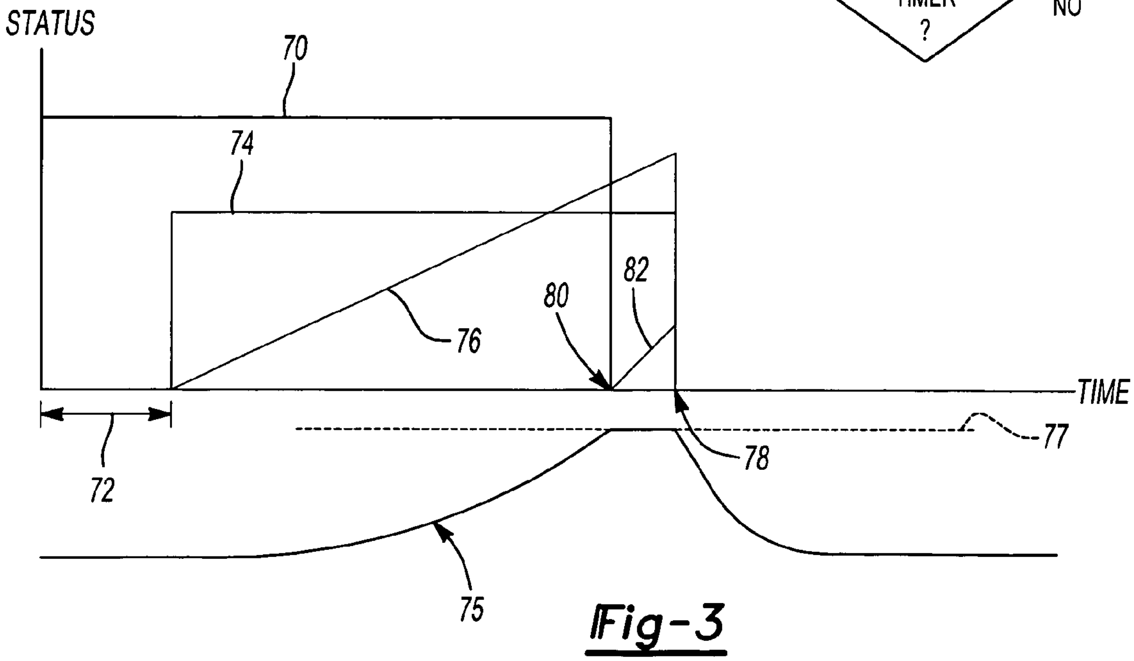
FIG. 3 is a graph that shows the relationship between engine off time and vacuum switch status.

An exemplary implementation of the vacuum switch and valve assembly integrity diagnostic method 40 is illustrated in FIG. 3. A switch signal 70 indicates whether the switch is open or closed. Although it is to be understood that the switch may be open at engine shutoff, the present example assumes that the switch is closed at engine shutoff. Therefore, the switch signal 70 is high, indicating that the switch is closed. A delay 72 follows engine shutoff in order to allow sufficient time for conditions to be met as described in FIG. 2. After the delay, the controller activates the purge solenoid in order to purge vacuum from the system. For example, the controller causes a purge signal 74 to go high. The purging of the vacuum is indicated by an increase of pressure 75. Concurrently, the controller initiates a timer 76. As the timer 76 increments, the controller continues to monitor the switch signal 70 to determine if the switch opens. Provided that the switch is functioning properly, the switch will open when the pressure reaches a threshold 77. If the switch does not open before the timer reaches a threshold time 78, the method 40 terminates and the controller stores data that indicates that the switch is closed. The purge valve 16 continues to purge vacuum from the system as indicated by the purge signal 74. If the switch opens as indicated by the switch signal 70 going low at 80, an integrity timer 82 is initiated. The integrity timer 82 allows the system to continue monitoring the switch signal 70 before powering down to ensure that the switch closed, and that the low switch signal was not erroneous. After the integrity timer 82 expires, the system shuts down at 78.

Figure 4:
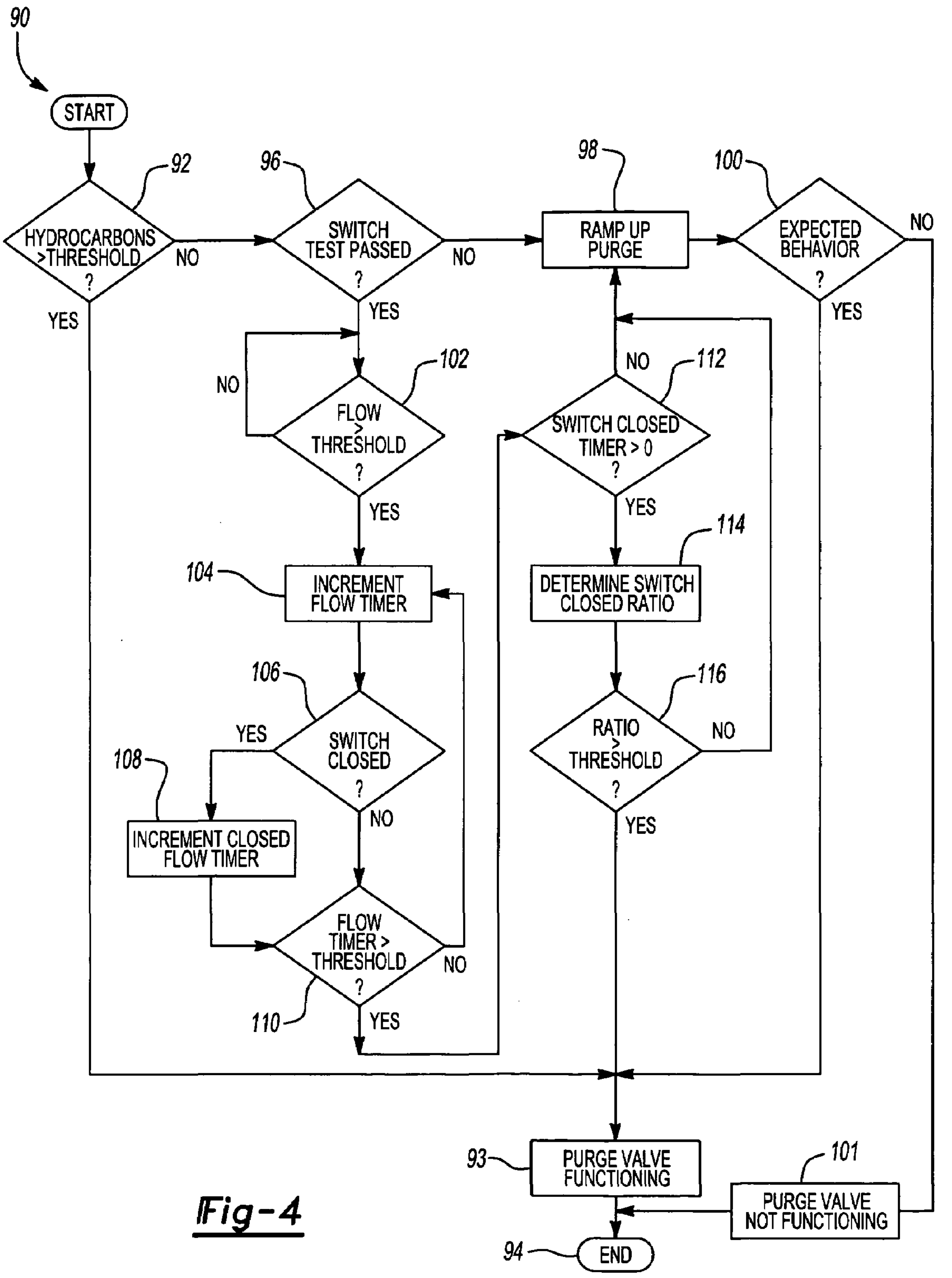
FIG. 4 is a flow diagram of a purge valve monitor method according to the present invention.

Referring again to FIG. 1, the system 10 may include other diagnostic functions to determine the functionality of various components. For example, even if the controller 18 determines that the vacuum switch and valve assembly is functioning properly, the controller 18 may determine that the purge valve 16 is malfunctioning. Referring now to FIG. 4, a purge valve monitor method 90 is shown. Fuel vapors that pass through the purge valve into the intake manifold include an amount of burnable impurities, such as hydrocarbons. The controller determines an expected ratio of hydrocarbons in the fuel vapor passing through the purge valve into the intake manifold. For example, the controller may include a model that determines burnable hydrocarbons from the purge valve based on expected engine performance due to burnable hydrocarbons, fuel, and airflow. At step 92, the controller determines if the rate of hydrocarbons exceeds a threshold. Because the controller modulates the amount that the purge valve is open, the controller is operable to determine the amount of hydrocarbons that should be passing through the purge valve. If the amount of hydrocarbons exceeds the threshold, the controller determines that the purge valve is functioning properly at step 93, and the method 90 terminates at step 94. If the rate of hydrocarbons does not exceed the threshold, the method 90 continues to step 96.

At step 96, the controller determines if the vacuum switch and valve assembly integrity diagnostic method 40 of FIG. 2 was successful. In other words, if the switch remained closed at the previous engine shutdown, the switch may not be functioning properly, and therefore the purge valve must be tested independently of the vacuum switch and valve assembly. The method 90 continues to step 98 if the switch was closed after the previous engine shutdown. At step 98, the controller gradually ramps up purge flow by opening the purge valve. Regardless of the functionality of the vacuum switch and valve assembly, fuel vapor will flow through conduits 22 and 30 and the purge valve 16, as shown in FIG. 1, provided that the conduits 22 and 30 and the purge valve 16 are functioning properly. At step 100, the controller determines if the increased flow of fuel vapor through the purge valve created the expected behavior in the engine. For example, if the purge valve is opened a particular amount, a predictable amount of burnable fuel vapor should pass through the purge valve into the intake manifold. Therefore, less fuel and/or air is required due to the additional air and fuel in the fuel vapor. Other components of the vehicle compensate for the fuel vapor by decreasing the amount of fuel and/or air delivered through the intake manifold through other means as are known in the art. However, if the predicted amount of fuel vapor, which is calculated according to purge valve position, is not received in the intake manifold, the proper amount of air and/or fuel will not be delivered to the engine. For example, the engine may run rich or lean. In this manner, the controller determines that the predicted amount of fuel vapor is not passing through the purge valve, and that the purge valve is therefore malfunctioning, at step 101. The method 90 then terminates at step 94.

If the method 90 determines that the vacuum switch and valve assembly integrity diagnostic method 40 was successful and the switch was open after the last engine shutdown, the method 90 continues to step 102. At step 102, the controller determines if the flow of the purge valve is greater than a threshold. If the flow of the purge valve is greater than the threshold, the method 90 continues to step 104. Step 104 repeats until the flow of the purge valve is greater than the threshold. At step 104, the controller increments a flow timer. At step 106, the controller determines if the switch is closed. If the switch is closed, the controller increments a switch closed timer at step 108 and continues to step 110. If the switch is not closed, the method 90 continues directly to step 110. At step 110, the controller determines if the flow timer is greater than a threshold. If the flow timer is not greater than the threshold, the method 90 repeats steps 104, 106, 108, and 110. If the flow timer is greater than the threshold, the method 90 continues to step 112.

At step 112, the controller determines if the switch closed time is greater than zero. If the switch closed timer did not increment during the duration of the flow timer, the value of the switch closed timer is zero. Therefore, in order to avoid a divide by zero error in the forthcoming step, the method 90 continues to step 98 if the switch closed timer is not greater than zero. At step 114, the controller determines the ratio of time that the switch was closed during the steps of 104, 106, 108, and 110. If the purge valve was functioning properly during this period, the purging of the vacuum would cause the switch to be closed intermittently. The controller determines the ratio by dividing the value of the switch closed timer by the value of the flow timer. At step 116, the controller determines if the ratio is greater than a threshold. If the ratio is not greater than the threshold, the method 90 continues to step 98. If the ratio is greater than the threshold, the controller determines that the purge valve is functioning properly at step 101 and terminates at step 94.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A diagnostic method for an evaporative emission control system of an automotive vehicle, the system in fluid communication with emissions from a fuel tank, an engine, a carbon canister, and atmosphere, the method comprising:

monitoring flow of emissions through a purge valve that is located between the engine and the canister, wherein the purge valve is operable to modulate between a fully open and a fully closed position;

determining a first ratio of burnable impurities in the emissions;

indicating that the purge valve is functioning properly if the first ratio is above a first threshold;

determining if flow of emissions through the purge valve is above a second threshold if the first ratio is not above the first threshold;

generating a signal that is indicative of a position of a switch located between the carbon canister and the atmosphere, wherein the position is one of open and closed when the evaporative emission control system is in one of a high and low negative pressure condition;

monitoring the signal to determine an amount of time that the evaporative emission control system is in the high negative pressure condition for a first period;

calculating a ratio of time that the evaporative emission control system is in the high negative pressure condition during the first period; determining if the ratio of time is above a second threshold;

indicating that the purge valve is functioning properly if the ratio of time is above the second threshold; and indicating that the purge valve is not functioning properly if the ratio of time is not above the second threshold.

2. A diagnostic method for an evaporative emission control system of an automotive vehicle, the system in fluid communication with emissions from a fuel tank, an engine, a carbon canister, and atmosphere, the method comprising:

monitoring flow of emissions through a purge valve that is located between the engine and the canister, wherein the purge valve is operable to modulate between a fully open and a fully closed position;

determining a first ratio of burnable impurities in the emissions;

indicating that the purge valve is functioning properly if the first ratio is above a first threshold;

opening the purge valve to the fully open position if the first ratio is not above the first threshold;

adjusting fuel and air flow into the engine according to an expected ratio of burnable emissions flowing through the purge valve, wherein the expected ratio is calculated according to the position of the purge valve;

monitoring one or more engine performance characteristics that are indicative of whether the expected ratio of burnable emissions is flowing through the purge valve;

indicating that the purge valve is functioning properly if the one or more engine performance characteristics indicate that the expected ratio of burnable emissions is flowing through the purge valve; and indicating that the purge valve is not functioning properly if the one or more engine performance characteristics indicate that the expected ratio of burnable emissions is not flowing through the purge valve.

3. A diagnostic method for an evaporative emission control system of an automotive vehicle, the system in fluid communication with emissions from a fuel tank, an engine, a carbon canister, and atmosphere, the method comprising:

determining if the engine is off;

determining if a speed of the engine is approximately zero;

waiting for a predetermined time;

generating a signal that is indicative of a position of a switch located between the carbon canister and the atmosphere, wherein the position is one of open and closed when the evaporative emission control system is in one of a high and low negative pressure condition;

monitoring the signal to determine whether the evaporative emission control system is in the high or low negative pressure condition;

purging the evaporative emission control system for a first period in order to dissipate negative pressure if the signal indicates that the emission control system is in the high negative pressure condition; and continuing to monitor the signal to determine if the evaporative emission control system changes from the high negative pressure condition to the low negative pressure condition during the first period.

4. The method of claim 3 further comprising indicating that the switch is functioning properly if one of the evaporative emission control system is in the low negative pressure condition and the evaporative emission control system changes from the high negative pressure condition to the low negative pressure condition during the first period.

5. The method of claim 3 further comprising indicating that the switch is not functioning properly if the evaporative emission control system does not change from the high negative pressure condition to the low negative pressure condition during the first period.

6. The method of claim 3 wherein the steps of monitoring are performed at a controller.

7. The method of claim 3 wherein the step of purging includes opening a purge valve that is located between the engine and the canister, wherein the purge valve is operable to modulate between a fully open and a fully closed position.

8. The method of claim 7 further comprising:

determining a first ratio of burnable impurities in the emissions;

indicating that the purge valve is functioning properly if the first ratio is above a first threshold;

determining if flow of emissions through the purge valve is above a second threshold if the first ratio is not above the first threshold;

monitoring the signal to determine an amount of time that the evaporative emission control system is in the high negative pressure condition for a second period;

calculating a second ratio that the evaporative emission control system is in the high negative pressure condition during the second period;

determining if the second ratio is above a second threshold;

indicating that the purge valve is functioning properly if the second ratio is above the second threshold; and indicating that the purge valve is not functioning properly if the second ratio is not above the second threshold.

9. The method of claim 7 further comprising:

determining a first ratio of burnable impurities in the emissions;

indicating that the purge valve is functioning properly if the first ratio is above a first threshold;

opening the purge valve to the fully open position if the first ratio is not above the first threshold:

adjusting fuel and air flow into the engine according to an expected ratio of burnable emissions flowing through the purge valve, wherein the expected ratio is calculated according to the position of the purge valve;

monitoring one or more engine performance characteristics that are indicative of whether the expected ratio of burnable emissions is flowing through the purge valve;

indicating that the purge valve is functioning properly if the one or more engine performance characteristics indicate that the expected ratio of burnable emissions is flowing through the purge valve; and indicating that the purge valve is not functioning properly if the one or more engine performance characteristics indicate that the expected ratio of burnable emissions is not flowing through the purge valve.

* * * * *